Patented Oct. 10, 1939

2,175,232

UNITED STATES PATENT OFFICE 2,175,232

THERMOPLASTIC MOLDING COMPOSITION AND PROCESS OF MAKING SAME

Robert V. Townend, Arlington, N. J., and Weaver R. Clayton, New York, N. Y., assignors to William Zinsser & Co., New York, N. Y., a corporation of New York No Drawing. Application April 9, 1937, Serial No. 135,974

15 Claims.  (Cl. 106—31)

Our invention relates to a modified shellac molding composition and to a process of treating shellac so that it will have improved properties, such as better molding characteristics, resistance to heat and to the action of solvents.

In our invention we treat shellac with zinc oxide and an oxide of a group of metals consisting of calcium, lead and magnesium. These oxides may be mixed thoroughly with the shellac either as a mixture of the oxides or separately depending upon the particular oxide being used and method of operations. The mixing may be accomplished in any suitable mixing apparatus, as for example, a Banbury mixer. After the oxides and shellac have been thoroughly mixed the mixture may be crushed to powder or granular form and then molded under heat and pressure. By preheating the powder at a temperature of approximately 300° F. for 15 to 30 minutes, its softening point or temperature may be greatly raised.

The properties of the resulting shellac are improved by this treatment with the oxides. It becomes more resistant to the solvent action of various solvents such as alcohols, alkalies and similar solvents. It is also less brittle and may be made to have a less specific gravity. Also in molding it tends to keep the molds cleaner and to improve the appearance of the molded articles. The higher softening point that may be imparted to the compositions enables them to be used under conditions where the untreated shellac would not be usable.

In making the composition, using oxides of zinc and calcium, and forming the molding composition containing fillers, the fillers are partially wet with shellac in a heated Banbury mixer. 20% of zinc oxide based on the shellac is added and the mass is melted until the fillers are thoroughly wet with the shellac. 10% of hydrated lime is then added. The lime causes a rapid setting up action of the mixture which causes the Banbury mixture to labor. The mix may be pushed and held in the mixture by means of a plunger and the mixing continued until the Banbury slows almost to a stop. Upon removing the plunger the mix is pushed out of the mixer because of its stiffness. After cooling, the mix may then be broken up and ground to any suitable fineness such as for example 10 mesh. After rolling the powder on paper it is ready for molding. By preheating it at about 300° F. for 15 to 20 minutes the softening point is greatly raised.

It is advantageous to add the zinc oxide first and the hydrated lime after the zinc oxide is thoroughly mixed because the lime causes thickening and stiffening of a mix much more rapidly than does the zinc oxide. If the hydrated lime were added before the zinc oxide it would be difficult to obtain a uniform mix. The mixes are generally poorer, also if the hydrated lime and zinc oxide are added at the same time, or as a mixture.

A shellac treated with both calcium oxide or hydroxide or lime and zinc oxide has different properties from a composition made with either zinc oxide or lime alone. As compared with zinc oxide it is less soluble in solvents, has a higher initial softening point and requires less preheating to increase the softening point, keeps the mold cleaner, is lower in cost and lower in specific gravity. As compared with a compound made of lime and shellac, it is less brittle, easier to manufacture, wets the fillers better, and is better resistant to the action of water.

The proportions of lime and zinc oxide and shellac may be varied in accordance with the properties desired in the resulting composition. The following typical compositions illustrate the range of the variation of the constituents:

|    | Beta shellac | Zinc oxide | Hydrated lime |
|----|--------------|------------|---------------|
|    | Pints        | Pints      | Pints         |
| #1 | 100          | 30         | 5             |
| #2 | 100          | 20         | 10            |
| #3 | 100          | 15         | 15            |

The higher the percentage of lime, the less baking that is required to attain a higher softening point. For example, a mixture of shellac and 40% zinc oxide without lime which, molded in one minute at 2000 lbs. pressure per square inch and heated with steam at 25 lbs. per square inch when baked at 300° F. for one hour was raised to a molding time of six minutes at 100 lbs. per square inch steam pressure and molding pressure of 3000 lbs. per square inch. A composition of shellac with approximately 22½% of zinc oxide and about 4% of hydrated lime having an initial molding time of 90 seconds at 45 lbs. per square inch of steam pressure and 2000 lbs. per square inch of molding pressure, had, on heating at 300° F. for thirty minutes a molding time of two minutes at 90 lbs. steam pressure and 2000 to 3000 lbs. per square inch molding pressure. The following is an example of a method of making molding powders of shellac treated with zinc oxide and lime:

31.2 parts of wood flour and 8 parts of cotton flock are mixed and partially wet with 45 parts of shellac in a Banbury mixer at a temperature of about 215° F. 13.5 parts zinc oxide are then introduced into the Banbury mixer and milled with the shellac for from two to four minutes, then 2.3 parts of hydrated lime are added and the Banbury is run until the mixture gets very stiff which will require about two minutes after the introduction of the lime. The composition is then taken from the Banbury and allowed to cool. It may then be broken up and ground to 10 mesh in a mill and is ready for molding, or its softening temperature may be increased by heating to 300° F. and holding it at this temperature for a period of time. This heating may be accomplished before the composition is ground.

When magnesium oxide is used with the zinc oxide, the oxides may be introduced as above, or may be added either before or with a zinc oxide. An example of this composition is as follows:

35.2 parts of wood flour and 4 parts of cotton flock are wet with 45 parts of shellac in a Banbury mixer at a temperature of about 215° F. When the fillers are thoroughly wet 11.3 parts of zinc oxide (equal to 25% of the shellac) are introduced into the Banbury mixer and milled for from two to five minutes, then 4.5 parts magnesium oxide (equal to 10% of the shellac) is milled into the mixture for from two to five minutes. The resulting mixture is taken from the Banbury mixer, partially cooled, and ground to 10 mesh. This composition molds at about 60 lbs. per square inch of steam pressure at a molding pressure of about 2000 lbs. per square inch.

A lead oxide zinc oxide shellac molding composition may be made in a similar manner by wetting a mixture of 33 parts of wood flour and 4 parts of cotton flock with 42 parts of shellac in a heated Banbury mixer, then adding 10.5 parts of zinc oxide and 10.5 parts of lead oxide, either in succession or simultaneously. The resulting composition has excellent molding properties and water resisting properties. Its softening points may also be raised by heating at 300° F.

The zinc-lead shellac composition also has desirable specific electric properties.

Through the above invention we have, therefore, provided a composition and a method of making it, having the desirable characteristics of shellac, but also having certain additional or enhanced characteristics that render it much more desirable for molding purposes.

What we claim is:

1. A thermoplastic molding powder comprising shellac, zinc oxide and an oxide of the group consisting of calcium oxide, magnesium oxide and lead oxide.

2. A thermoplastic molding powder comprising shellac, zinc oxide and a calcium oxide.

3. A thermoplastic molding powder comprising shellac, zinc oxide and a lead oxide.

4. A thermoplastic molding powder comprising shellac, zinc oxide and a magnesium oxide.

5. A thermoplastic molding powder comprising shellac, zinc oxide, calcium oxide, the calcium oxide being smaller in quantity than the zinc oxide.

6. A thermoplastic molding powder comprising shellac, zinc oxide and calcium oxide, the calcium oxide being smaller in quantity than the zinc oxides and the total quantities of oxides being less than 30% of the shellac content of the mixture.

7. A thermoplastic molding powder comprising shellac, zinc oxide and an oxide of the group consisting of calcium oxide, magnesium oxide and lead oxide, and containing fibrous fillers.

8. A thermoplastic molding powder comprising shellac, zinc oxide and an oxide of the group consisting of calcium oxide, magnesium oxide and lead oxide, and having a softening point at approximately 300° F. or above.

9. A process for making a thermoplastic molding powder which comprises heating a mixture of shellac, zinc oxide and an oxide of the group consisting of calcium oxide, lead oxide and magnesium oxide.

10. A process for making a thermoplastic molding powder which comprises heating a mixture of shellac, zinc oxide and an oxide of the group consisting of calcium oxide, lead oxide and magnesium oxide, and maintaining the temperature of said mixture at about 300° F. for a limited period of time.

11. A process for making a thermoplastic molding powder which comprises mixing shellac with zinc oxide and then with calcium oxide at an elevated temperature.

12. A process for making thermoplastic molding powder which comprises mixing shellac with 30% of zinc oxide and then mixing the mixture with 5% of calcium oxide based on the quantity of shellac.

13. A process for making a thermoplastic molding powder which comprises wetting flocculent materials with shellac at an elevated temperature, mixing zinc oxide into said mixture and then mixing the calcium oxide into the resulting mixture.

14. In the process for making a thermoplastic composition which comprises wetting flocculent materials with shellac at an elevated temperature, and then mixing with said mixture the oxides of zinc and lead.

15. In the process for making a thermoplastic composition which comprises wetting flocculent materials with shellac at an elevated temperature, and then mixing with said mixture the oxides of zinc and magnesium.

ROBERT V. TOWNEND.
WEAVER R. CLAYTON.

CERTIFICATE OF CORRECTION.

Patent No. 2,175,232.　　　　　　　　　　　　October 10, 1939.

ROBERT V. TOWNEND, ET AL.

It is hereby certified that error appears in the printed specification of the above numbered patent requiring correction as follows: Page 1, second column, line 30, in the table, for the word "Pints" three occurrences, read Parts; and that the said Letters Patent should be read with this correction therein that the same may conform to the record of the case in the Patent Office.

Signed and sealed this 14th day of November, A. D. 1939.

Henry Van Arsdale,
Acting Commissioner of Patents.

(Seal)